July 21, 1936.                L. HODEK                2,048,381
CONDIMENT SHAKER
Filed May 27, 1935
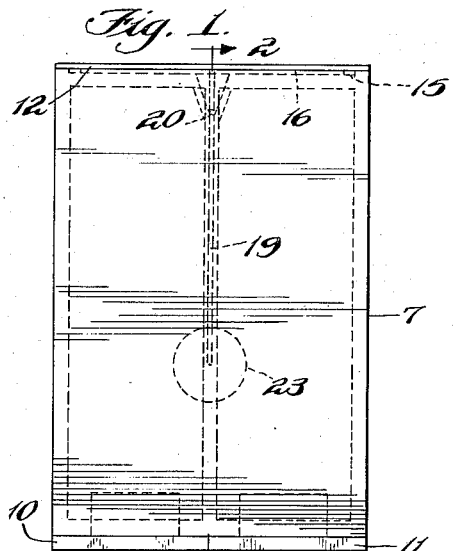
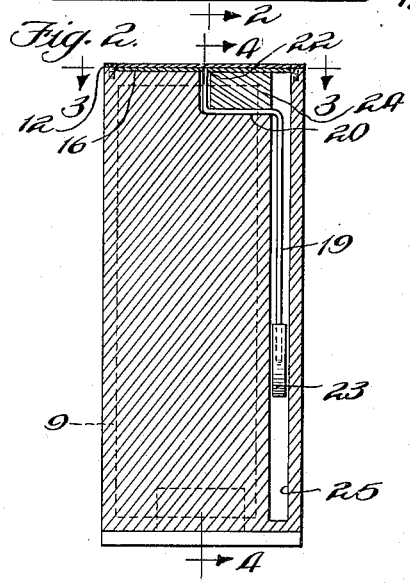
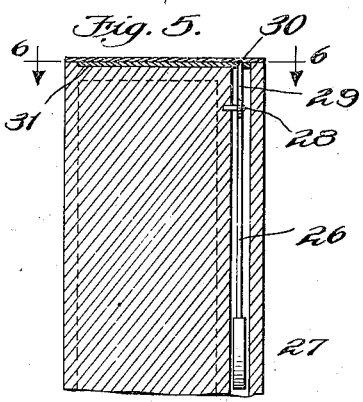
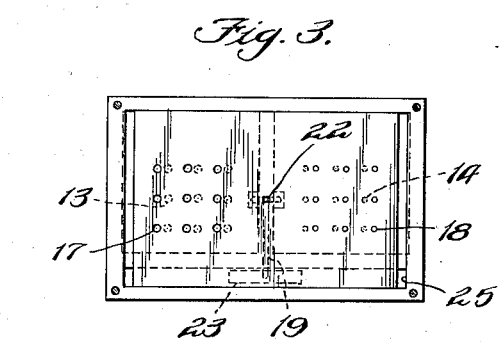
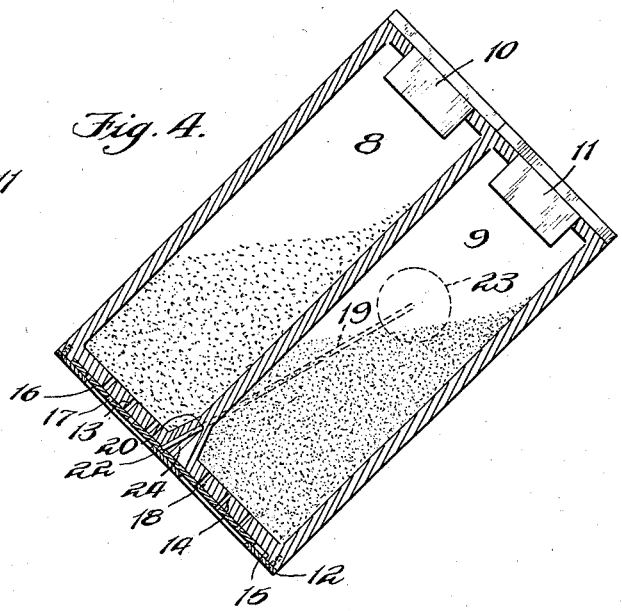
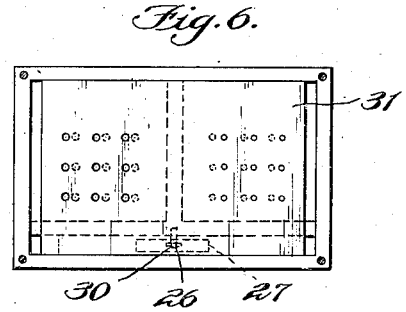
INVENTOR.
Louis Hodek
BY Glenn S. Noble
ATTORNEY.

Patented July 21, 1936

2,048,381

UNITED STATES PATENT OFFICE 2,048,381

CONDIMENT SHAKER

Louis Hodek, Cicero, Ill.

Application May 27, 1935, Serial No. 23,621

2 Claim. (Cl. 65—45)

This invention relates to shakers such as commonly used for table purposes and while it is adapted for various condiments it is particularly applicable for use with salt and pepper or where two different condiments may be conveniently dispensed from a single receptacle.

The objects of this invention are to provide an improved shaker of the kind set forth whereby one or another of different condiments may be conveniently and readily shaken from a single shaker without being mixed with another condiment in the same shaker; to provide a shaker having two compartments with separate outlet orifices for each compartment, and means for selectively opening and closing the outlets of the different compartments in accordance with the position of the shaker; to provide a shaker having a controlling slide for controlling the outlet holes and having gravity controlled means for actuating the slide to adjust it to different positions; to provide an improved shaker having separate compartments for salt and pepper and novel means for controlling the discharge openings whereby either one or the other of said ingredients may be discharged; and in general to provide such an improved shaker and new article of manufacture as will be described more fully hereinafter.

In the accompanying drawing illustrating this invention,

Figure 1 is a side view with interior parts shown in dotted lines;

Figure 2 is a sectional view taken on the line 2—2 of Figure 1;

Figure 3 is a sectional view taken on the line 3—3 of Figure 2;

Figure 4 is a sectional view taken on the line 4—4 of Figure 2; and showing the figure in inverted or operating position;

Figure 5 is a sectional view showing a slightly modified form of construction; and Figure 6 is a sectional view taken on the line 6—6 of Figure 5.

As shown in the drawing the casing 7 which may be made of any suitable material, is provided with two compartments or chambers 8 and 9 for different condiments, as for salt and pepper. The casing may be constructed in any suitable manner and of any suitable material. Corks or plugs 10 and 11 provide means for closing the filling openings at the bottom of the respective compartments. The top wall or cover portion 12 of the casing is provided with two sets of holes or outlet orifices 13 and 14 which are substantially in alignment with the ends of the compartments 8 and 9 and through which the condiments from the respective compartments may be shaken. In the arrangement shown, the holes 13 which are intended for the salt are conventionally made larger than the holes 14 for the pepper. Immediately above these sets of openings and under the cover 12 I provide a slideway 15 for a controlling slide or plate 16 which fits closely therein and which is adapted to slide longitudinally. This slide may be made of any suitable material as for instance of sheet metal which is preferably made sufficiently thin so that the holes therein are not apt to become clogged. This plate or slide has one set of holes 17 which are adapted to register at times with the holes 13 and also has another set of holes 18 which are adapted to register at times with the holes 14. The arrangement of these sets of holes is such that when the holes 18 register with the holes 14, for instance as shown in Figure 4, in order to permit discharge of the contents of compartment 9, the holes 17 are out of registry with the holes 13 and therefore the plate will prevent discharge of the contents of chamber 8.

The slide 16 is actuated by a bell crank lever 19 which is pivoted at 20 in a V-shaped slot 21 in the center wall of the casing 7. One end of the lever engages with a hole or recess 22 in the plate 16 and the other end of the lever is provided with a weight 23. The pivotal part of the lever is held by a V-shaped wedge or plug 24. The casing 7 has another compartment or opening 25 in which the lever is mounted, the arrangement being such that the lever and weight and other associated moving parts are entirely closed from view.

When the shaker is in normal upright position as shown in Fig. 1, the weight 23 will hold the lever in vertical position with the slide 16 centrally disposed, at which time all of the discharge holes are preferably closed by the slide. When the shaker is to be used it is turned to more or less inverted position as shown in Figure 4 with the compartment from which the condiment is to be shaken on the lower side. During this movement the weight 23 swings the corresponding end of the lever downwardly and the other end moves the slide 16 upwardly, in which position the holes 18 will register with the holes 14 and permit the discharge of the material from the compartment 9. At this time the holes 13 are covered by the plate or slide 16. If salt or condiment from the compartment 8 is desired the shaker is held in reversed position, at which time the holes 13 will be opened and the holes 14 closed.

In the modified form of construction shown in Figures 5 and 6 the lever 26 is made straight with the weight 27 at one end thereof. The lever is pivotally mounted at 28 with the end portion 29 engaging with a hole or recess 30 in the plate or slide 31 which corresponds with the slide 16. In this arrangement the lever engages with the side of the plate instead of the center as with the bell crank lever 19. Otherwise the construction and operation is substantially the same as above described.

It will be noted that changes may be made in the arrangement of the parts or construction of the casing without departing from the spirit of this invention and therefore I do not wish to be limited to the exact arrangement shown and described except as set forth in the following claims, in which I claim:

1. A salt and pepper shaker comprising a casing having two substantially parallel adjacent compartments, sets of holes in the end of the casing for the respective compartments, a slideway adjacent to said holes, a slide mounted in said slideway for opening and closing said holes, a lever pivotally mounted in the casing and having one end connected with the slide and a weight at the opposite end of the lever, the arrangement being such that when the shaker is in normal position all of the holes will be closed and when the shaker is moved to operating position, one of said sets of holes will be closed and the other opened.

2. In a shaker, the combination of a casing having two substantially parallel adjacent compartments for condiments, the top of the casing having one set of outlet holes for one of the compartments and another set of outlet holes for the other compartment, a slideway adjacent to the top, a slide mounted in said slideway, said slide having one set of holes adapted to register at times with the first set of holes and another set of holes adapted to register at times with the second set of holes, a recess in said casing, a lever pivotally mounted in said recess and having one end engaging with the slide for actuating the same, and a weight at the opposite end of the lever.

LOUIS HODEK.